UNITED STATES PATENT OFFICE.

ADOLPH CLEMM, OF MANNHEIM, BADEN, GERMANY.

METHOD OF DESTROYING INSECTS.

SPECIFICATION forming part of Letters Patent No. 380,189, dated March 27, 1888.

Application filed March 30, 1886. Serial No. 197,106. (No specimens.) Patented in Germany February 19, 1886, No. 37,586; in England March 11, 1886, No. 4,367; in Italy March 23, 1886, No. 19,575; in Belgium March 31, 1886, No. 72,278; in France June 15, 1886, No. 174,441; in Spain August 21, 1886, No. 2,203, and in Austria-Hungary October 4, 1886, XXXVI, 2,030.

*To all whom it may concern:*

Be it known that I, ADOLPH CLEMM, of Mannheim, in the Grand Duchy of Baden and Empire of Germany, have invented certain new and useful Improvements in Methods of Destroying Insects and Animals Injurious to Plants, (for which Letters Patent have heretofore been granted to me by the Government of Germany, dated February 19, 1886, No. 37,586; France, June 15, 1886, No. 174,441; England, March 11, 1886, No. 4,367; Belgium, March 31, 1886, No. 72,278; Spain, August 21, 1886, No. 2,203; Italy, March 23, 1886, No. 19,575, and Austria-Hungary, October 4, 1886, tome 36, fol. 2,030,) of which the following is a specification.

This invention relates to an improved method of destroying insects and animals injurious to plants and vegetables in an effective and reliable manner without injury to the plants or vegetables; and the invention consists in impregnating the ground, first by a solution of a sulphide of an alkali and carbonate of an alkali, and then saturating the ground with a suitable diluted acid, whereby gases destructive to insects and animals are produced and salts formed which promote the growth of the plants and vegetables.

In carrying out my method of destroying insects injurious to plants it is preferable to saturate the ground first with a diluted solution of a sulphide and a carbonate, which is preferably accomplished either by means of ditches or by holes bored into the earth, or in any other suitable manner. When the solution has been distributed in the earth, a diluted solution of a suitable acid is distributed in the same manner in the ground, after which the ditches or holes are filled up with earth. In this manner a uniform distribution of the solutions in the ground is obtained, and consequently, by the reaction of the same, free gases generated which are poisonous to insects—to wit, sulphureted hydrogen and carbonic acid.

The following sulphides may be used for the sulphide solution: potassium sulphide, ammonium sulphide, sodium sulphide or a mixture of the same. For the carbonate solution may be used carbonate of soda or potash. For the acid solutions phosphoric, nitric, or sulphuric acid may be employed with advantage.

It is obvious that by a proper selection and combination of these salts and acids there are formed in the earth simultaneously with the generation of gases poisonous to the insects and small burrowing animals salts which, like phosphate of potash, sulphate of potash, or ammonium, nitrate of soda, &c., promote by their alimentary qualities the growth of the plants. Consequently, the essential advantage of my improved method consists in the simultaneous formation of quickly-acting poisonous gases and of substances which act as fertilizers for the plants. The latter feature is of great importance, as plants attacked by parasitical insects are in most cases considerably weakened and are enabled to regain their former strength and vigor by the supply of alimentary salts furnished to them.

The described method can be used for destroying insects and animals of all kinds, and is specially adapted for destroying the phylloxera and the Colorado bug. It serves also for killing mice, moles, and other burrowing animals that infest the ground.

The method described is considerably cheaper than the methods heretofore employed, especially as very diluted solutions can be employed and as the expense for the chemicals is fully compensated by the fertilizing value of the resulting salts, which feature renders it superior to the impregnating of the ground with sulphuret or carbon, whether it be used as such or in the form of xanthogenate or sulpho-carbonate.

Having thus described my invention, I claim as new and desire to secure by Letters Patent—

The method herein described of destroying insects and animals injurious to plants and vegetables, which consists in impregnating the ground with a solution of a sulphide of an alkali and carbonate of an alkali, and subsequently impregnating the ground with a diluted acid solution, whereby simultaneously free gases poisonous to insects and animals and salts that act as fertilizing agents are formed, substantially as set forth.

In testimony that I claim the foregoing as my invention I have signed my name in presence of two subscribing witnesses.

ADOLPH CLEMM.

Witnesses:
PAUL GRULIM,
HARRY E. HAMMOND.